(12) United States Patent
Nowak et al.

(10) Patent No.: US 10,858,497 B2
(45) Date of Patent: Dec. 8, 2020

(54) CORE-SHELL PARTICLES, COMPOSITIONS INCORPORATING THE CORE-SHELL PARTICLES AND METHODS OF MAKING THE SAME

(71) Applicant: The Boeing Company, Chicago, IL (US)

(72) Inventors: Andrew P. Nowak, Los Angeles, CA (US); Sophia S. Yang, Arcadia, CA (US); Thomas I. Boundy, Agoura Hills, CA (US); Darrin M. Hansen, Seattle, WA (US); Alain A. Adjorlolo, Shoreline, WA (US); Carissa A. Pajel, Redmond, WA (US); Eliana V. Ghantous, Woodland Hills, CA (US)

(73) Assignee: THE BOEING COMPANY, Chicago, IL (US)

( * ) Notice: Subject to any disclaimer, the term of this patent is extended or adjusted under 35 U.S.C. 154(b) by 148 days.

(21) Appl. No.: 15/825,007

(22) Filed: Nov. 28, 2017

(65) Prior Publication Data

US 2018/0079885 A1 Mar. 22, 2018

Related U.S. Application Data

(62) Division of application No. 14/681,747, filed on Apr. 8, 2015, now Pat. No. 9,856,359.

(51) Int. Cl.
*C08K 3/22* (2006.01)
*C09D 181/04* (2006.01)
(Continued)

(52) U.S. Cl.
CPC .............. *C08K 3/22* (2013.01); *B22F 1/0059* (2013.01); *B22F 1/02* (2013.01); *B22F 7/08* (2013.01);
(Continued)

(58) Field of Classification Search
None
See application file for complete search history.

(56) References Cited

U.S. PATENT DOCUMENTS

| 3,123,495 A | 3/1964 | Carpenter et al. |
| 3,457,099 A | 7/1969 | De Angelo, Jr. et al. |

(Continued)

FOREIGN PATENT DOCUMENTS

| EP | 1786867 B1 | 1/2008 |
| JP | 2012-188323 A | 4/2012 |

(Continued)

OTHER PUBLICATIONS

Bhatia et al. NPL article (Anal. Biochem., 178, 408-413, 1989. (Year: 1989).*

(Continued)

*Primary Examiner* — Kevin M Bernatz
(74) *Attorney, Agent, or Firm* — MH2 Technology Law Group LLP

(57) ABSTRACT

A low viscosity polysulfide sealant composition. The composition comprises a curable polysulfide polymer; a cross-linking agent; and a plurality of core-shell particles. The core-shell particles comprise: a core comprising a ferromagnetic material; and a shell comprising silica treated with an organic sulfur containing compound. The shell is capable of bonding with the polysulfide polymer.

20 Claims, 4 Drawing Sheets

(51) Int. Cl.

| | | |
|---|---|---|
| *C08K 9/06* | (2006.01) | |
| *B22F 1/02* | (2006.01) | |
| *C09K 3/10* | (2006.01) | |
| *C08L 81/02* | (2006.01) | |
| *C08L 81/04* | (2006.01) | |
| *H01F 1/00* | (2006.01) | |
| *B22F 1/00* | (2006.01) | |
| *B22F 7/08* | (2006.01) | |
| *B22F 9/24* | (2006.01) | |
| *B82Y 25/00* | (2011.01) | |
| *B82Y 30/00* | (2011.01) | |

(52) U.S. Cl.
CPC .............. *B22F 9/24* (2013.01); *C08K 9/06* (2013.01); *C08L 81/02* (2013.01); *C08L 81/04* (2013.01); *C09D 181/04* (2013.01); *C09K 3/1012* (2013.01); *H01F 1/0054* (2013.01); *B22F 2304/058* (2013.01); *B22F 2998/10* (2013.01); *B22F 2999/00* (2013.01); *B82Y 25/00* (2013.01); *B82Y 30/00* (2013.01); *C08K 2201/01* (2013.01); *C22C 2202/02* (2013.01)

(56) References Cited

U.S. PATENT DOCUMENTS

| | | | |
|---|---|---|---|
| 3,936,412 | A | 2/1976 | Rocholl et al. |
| 4,143,027 | A | 3/1979 | Sollman et al. |
| 5,663,219 | A | 9/1997 | Chokshi et al. |
| 6,172,179 | B1 | 1/2001 | Zook et al. |
| 6,232,401 | B1 | 5/2001 | Zook et al. |
| 6,359,046 | B1 | 3/2002 | Cruse |
| 7,553,908 | B1 | 6/2009 | Cosman et al. |
| 8,877,835 | B2 | 11/2014 | Herzog et al. |
| 9,856,359 | B2 * | 1/2018 | Nowak ............... C09D 181/04 |
| 2002/0013428 | A1 | 1/2002 | Zook et al. |
| 2004/0026028 | A1 | 2/2004 | Kristen et al. |
| 2004/0220327 | A1 | 11/2004 | Cosman et al. |
| 2005/0039848 | A1 | 2/2005 | Kirsten |
| 2005/0245695 | A1 | 11/2005 | Cosman |
| 2008/0108723 | A1 | 5/2008 | Taniguchi |
| 2008/0119620 | A1 | 5/2008 | Kato et al. |
| 2009/0312457 | A1 | 12/2009 | Tokumitsu |
| 2010/0196746 | A1 | 8/2010 | Koyanaka |
| 2010/0210745 | A1 | 8/2010 | McDaniel et al. |
| 2010/0284917 | A1 * | 11/2010 | Kustner ............... B82Y 15/00 424/9.1 |
| 2012/0130023 | A1 | 5/2012 | Herzog et al. |
| 2013/0064972 | A1 | 3/2013 | Koyanaka et al. |
| 2013/0089614 | A1 * | 4/2013 | Zhang ............... A61K 49/1833 424/489 |
| 2013/0210047 | A1 * | 8/2013 | Tang ............... C07D 207/448 435/18 |
| 2013/0344237 | A1 | 12/2013 | Guo |
| 2014/0336340 | A1 | 11/2014 | Suga et al. |
| 2015/0065599 | A1 | 3/2015 | Kralev et al. |
| 2016/0250612 | A1 | 9/2016 | Oldenburg et al. |

FOREIGN PATENT DOCUMENTS

| | | |
|---|---|---|
| RU | 2332436 C1 | 8/2008 |
| WO | WO 2014/099219 A1 | 6/2014 |

OTHER PUBLICATIONS

Yu-Ting Wang et al., "Synthesis of Nanostructured Mesoporous Manganese Oxides with Three-Dimensional Frameworks and Their Application in Supercapacitors", The Journal of Physical Chemistry C, 115, 2011, pp. 5413-5421, In parent Application.

A. M. Usmani, "Polymer-Plastics Technology and Engineering", Chemistry and Technology of Polysulfide Sealants, published online Dec. 6, 2006, pp. 1-37, In parent Application.

Anderson et al., "Applying Silanes", Gelest, Silicon Compounds: Silanes and Silicones, A Survey of Properties and Chemistry, 3rd Edition, 2013, p. 144, In parent Application.

Meizhen Gao et al., "Synthesis and Characterization of Superparamagnetic Fe3O4@SiO2 Core-Shell Composite Nanoparticles", World Journal of Condensed Matter Physics, 1, 2011, pp. 49-54, In parent Application.

Eugene R. Bertozzi, "Chemistry and Technology of Elastomeric Polysulfide Polymers", Mar. 1968, pp. 114-160, In parent Application.

Author Unknown, Bis[3-(triethoxysilyl)propyl] tetrasulfide, Sigma-Aldrick, Copyright 2015, http://www.sigmaaldrich.com/catalog/product/aldrich/15200?lang=en&region=US, accessed Feb. 12, 2015, pp. 1-2, In parent Application.

Nicolas Spassky et al., "Polymers Containing Sulfur in the Main Chain", Handbook of Polymer Synthesis Part B, Chapter 16, 1992, pp. 991-1076, In parent Application.

Partial Search Report for corresponding European Application No. 16163816.8 dated Sep. 12, 2016, In parent Application.

EP Communication pursuant to Article 94(3) EPC dated Jun. 11, 2018 in corresponding European Application No. 16 163 816.8.

Tatyana et al., "Water Vapor Adsorption by Some Manganese Oxide Forms," Colloids and Interfaces, vol. 2, No. 4, 61 (2018) 10 pages.

Extended European Search Report dated Nov. 28, 2019 in corresponding European Application No. 19190083.6, 8 pages.

Notice of Reasons for Rejection dated Jun. 23, 2020 in related corresponding Japanese Application No. 2016-077337, 8 pages (including English translation).

\* cited by examiner

| Elem | Wt.% | At.% |
|---|---|---|
| O | 38.89 | 56.39 |
| Si | 44.41 | 36.68 |
| Fe | 16.70 | 6.94 |
| Total | 100.00 | 100.00 |

| Elem | Wt.% | At.% |
|---|---|---|
| O | 4.78 | 61.33 |
| Si | 40.60 | 32.40 |
| Fe | 15.61 | 6.27 |
| Total | 100.00 | 100.00 |

CORE-SHELL PARTICLES, COMPOSITIONS INCORPORATING THE CORE-SHELL PARTICLES AND METHODS OF MAKING THE SAME

CROSS REFERENCE TO RELATED APPLICATIONS

This application is a divisional of, and claims priority to, U.S. patent application Ser. No. 14/681,747, filed Apr. 8, 2015 and issued as U.S. Pat. No. 9,856,359 on Jan. 2, 2018, the disclosure of which is incorporated herein by reference in its entirety.

FIELD OF THE DISCLOSURE

The present disclosure is directed to core-shell particles, and in particular, polysulfide sealant compositions comprising the core-shell particles.

BACKGROUND

Curable liquid polysulfide polymer based sealants for use in aerospace applications have long been known in the art. They are composed of curable viscoelastic resins that are applied to a substrate and molded to a thin film in order to conform to the substrate. The chemical structure of these polysulfide sealants is generally that of aliphatic polymers capable of possessing oxygen and sulfur in the backbone where the sulfur can often be found as consecutive atoms along the backbone (e.g., disulfide, trisulfide, tetrasulfide, etc). Such materials are known as 'Thiokols' after the company that first produced them.

Application of the sealants to a substrate is often carried out in stages using two separate polysulfide compositions. During a first stage of application, a lower viscosity paintable formula is brushed on to the substrate and allowed to flow into surface asperities. This first stage composition contains adhesion promoters, most commonly silanes, that are designed to diffuse to the substrate surface and bond with reactive substrate surface moieties and the polysulfide network to form a covalent link and improve adhesion. In addition, the first stage composition may function to clean the substrate, act as a void filler for corrosion and leak protection, and promote robust adhesion of the second stage high viscosity composition to the structure. Following application of the first stage composition, a more viscous second stage polysulfide resin is applied over the thin first stage surface layer. The second stage composition can be shaped to the contours of the substrate surface, such as around joints, gaps and bolts, for example. After application to the substrate, the second stage composition cures to a tack free elastomeric material where together the first and second stages act as a fuel and corrosion barrier.

A longstanding problem with traditional polysulfide sealant systems is that the kinetics of curing and adhesion development is undesirably slow for many manufacturing purposes. Often, curing to a tack free condition and hardness along with adequate interfacial bond strength is required before technicians can be allowed to work near a recently installed sealant joint or to perform subsequent build processes without risk of debonding the material. Such a situation slows overall assembly time and manufacturing efficiency.

Modern Thiokols-based sealant compositions used in integral fuel tank applications are cured using $MnO_2$ particles that oxidatively crosslink thiol end groups of polysulfide precursors. Cure rate of the second stage bulk material is primarily determined by $MnO_2$ loading level and temperature, which is typically fixed at the ambient temperature of the manufacturing floor.

Thus, there is a need in the art for materials and processes that can provide rapid adhesion of a polysulfide polymer to a substrate. Processes and/or materials that can produce a more rapid cure of bulk polysulfide sealant while still providing good adhesion would be a welcome addition to the art.

SUMMARY

The present disclosure is directed to a low viscosity polysulfide sealant composition. The composition comprises a curable polysulfide polymer; a crosslinking agent; and a plurality of core-shell particles. The core-shell particles comprise a core comprising a ferromagnetic material and a shell comprising silica treated with an organic sulfur-containing compound. The shell is capable of bonding with the polysulfide polymer.

The present disclosure is also directed to a high viscosity polysulfide sealant composition. The high viscosity polysulfide sealant composition comprises: a curable polysulfide polymer; a crosslinking agent; and a powder comprising high surface area $MnO_2$ particles having a particle size of 100 nm or less. The high viscosity polysulfide sealant composition has a viscosity ranging from about 1000 Poise to about 100,000 Poise.

The present disclosure is also directed to a process. The process comprises coating a substrate with a first polysulfide sealant composition to form a first sealant layer. The polysulfide sealant composition has a first viscosity and comprises: (a) a curable polysulfide polymer; and (b) a plurality of core-shell particles. The core-shell particles comprise: (i) a core comprising a ferromagnetic material; and (ii) a shell comprising silica treated with an organic sulfur-containing compound capable of bonding with the polysulfide polymer and the substrate. The first sealant layer is exposed to a magnetic field to consolidate the core-shell particles at an interface between the first sealant layer and the substrate. The first sealant layer is coated with a second polysulfide sealant having a second viscosity that is greater than the first viscosity to form a second sealant layer.

The present disclosure is directed to a core-shell particle. The core-shell particle comprises: a core comprising a ferromagnetic material; and a shell comprising silica treated with an organic sulfur-containing compound to provide a sulfur-containing moiety attached to the shell.

The present disclosure is also directed to a process for making core-shell particles. The process comprises coating a ferromagnetic particle with a silica shell. The silica shell is treated with an organic sulfur-containing compound to form a sulfur-containing moiety attached to the silica shell.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

Figure 1A:
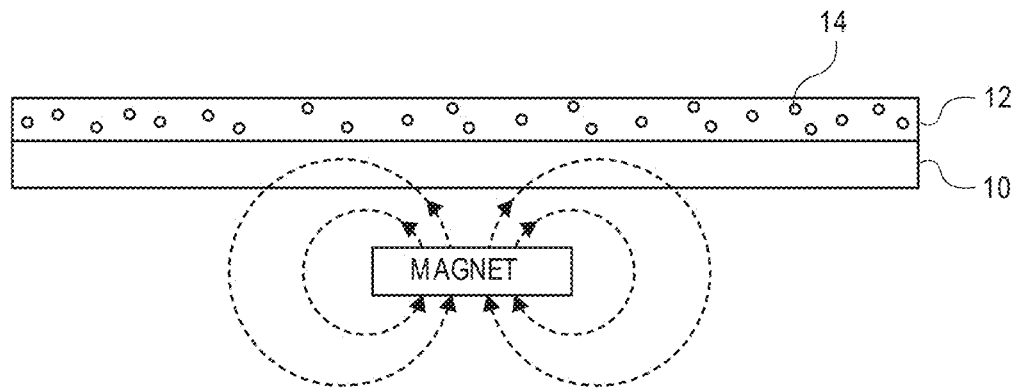
FIG. 1A and FIG. 1B illustrate a schematic view of a process for applying polysulfide sealant compositions, according to an aspect of the present disclosure.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

Increasing cure speed for state of the art commercial polysulfide sealant technology involves addressing both cure to adhesion kinetics and accelerating cure times of bulk polysulfide material. Accelerating cure times while achieving suitable adhesion involves overcoming the rate of diffusion and reactivity of adhesion promoters through incorporation of specially tailored, magnetic, core-shell particles. The core-shell particles are surface treated with binding groups able to couple to both the polysulfide network and the substrate. While not intending to be bound by theory, incorporation of the magnetic particles into a low viscosity polysulfide based primer is expected to speed adhesive bond strength by rapidly consolidating adhesive elements at the polysulfide/substrate interface through application of a magnetic field. In parallel, high viscosity bulk polysulfide curing rate can be increased through the use of a $MnO_2$ curative that has a higher surface area per unit weight than the traditional $MnO_2$ used in current systems. This higher surface area $MnO_2$ will be discussed in more detail below. Such modification is designed to maintain the same cured network character by potentially allowing use of identical compositional species while increasing cure rate through morphological differences. The terms "low viscosity" and "high viscosity" as used in connection with the polysulfide sealant compositions are used to distinguish the low viscosity polysulfide sealant composition from a subsequently formed "high viscosity" polysulfide sealant composition that generally forms the bulk of the sealant coating. Therefore, for purposes of the present application, the term "low viscosity" means that the viscosity of the polysulfide sealant composition is lower than that of the subsequently applied high viscosity polysulfide composition. Further, the term "high viscosity" means that the viscosity of the polysulfide sealant composition is higher than that of the low viscosity polysulfide composition.

The present disclosure is directed to a process for applying a polysulfide sealant composition to a substrate. Referring to FIG. 1A, the process comprises coating a substrate 10. Substrate 10 can be any suitable substrate, such as an aluminum or carbon fiber panel substrate. In an example, the substrate is an aircraft part.

The substrate 10 is coated with a first, low viscosity polysulfide sealant composition to form a first sealant layer 12. The low viscosity polysulfide sealant composition can comprise a curable polysulfide polymer matrix and a plurality of core-shell particles 14. Any of the core-shell particles described herein below can be employed.

Figure 1B:
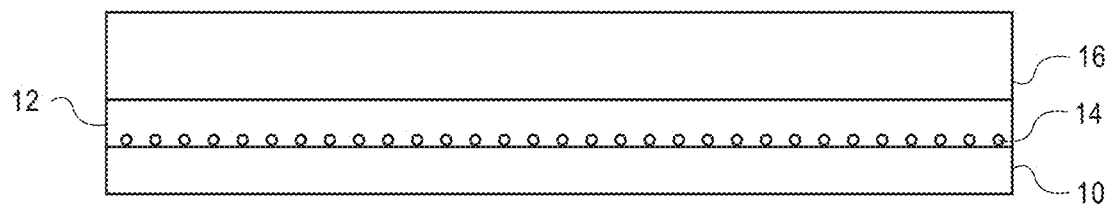

The low viscosity sealant layer 12 is exposed to a magnetic field, as illustrated by the dotted lines extending from the magnet in FIG. 1A. Any suitable type of magnet can be employed, such as an electromagnet or fixed permanent magnet. The exposure to the magnetic field is designed to consolidate core-shell particles 14 at an interface between the first sealant layer 12 and the substrate 10, as shown for example at FIG. 1B. Under the application of the magnetic field, the adhesive core-shell particles can be rapidly localized near the surface where they are able to react and bond with surface groups bound to the underlying substrate. Such a mechanism of transporting adhesion promoters to a substrate surface is designed to accelerate development of adhesive bond strength and allow for increased cure rate of bulk polysulfide material without inhibiting interfacial bond strength.

After application on the substrate 10, the first sealant layer 12 is coated with a high viscosity polysulfide composition to form a second sealant layer 16. Exposure to the magnetic field, as described above, can occur before, during and/or after applying the high viscosity polysulfide composition. Following coating of the high viscosity polysulfide composition, drying and/or curing of the sealant layers 12 and/or 16 can be carried out. Any suitable coating, drying and/or curing techniques can be employed. Suitable techniques are well known in the art.

In one example of a curing technique, the sealant layers 12 and 16 are maintained at a cure temperature for a suitable period of time to dry and/or cure the layers. The drying and/or curing can optionally include heating above ambient temperature. The cure temperature can range from about 0° C. to about 80° C., such as about 20° C. to about 30° C. If heating is employed, any suitable technique can be used.

In one example, optionally heating the sealant layers includes exposing the core-shell particles to a magnetic field of sufficient frequency and intensity to inductively heat the core-shell particles. Unlike the relatively constant magnetic field used to accelerate the core-shell particle movement towards the interface, an alternating or changing magnetic field can be used to heat the particles. The magnetic field for inductive heating can be applied alone or in addition to a secondary heat source used for curing the coating.

The low viscosity polysulfide sealant composition will now be described in more detail. As discussed above, the low viscosity sealant composition comprises a curable polysulfide polymer and a plurality of core-shell particles. Any polysulfide polymer suitable for use in sealant compositions can be employed. Examples include poly(ethylformal disulfide), poly(thioether), and combinations thereof. A variety of commercially available polysulfide based primers that are suitable as aircraft sealants can be readily obtained by one of ordinary skill in the art.

Figure 2:
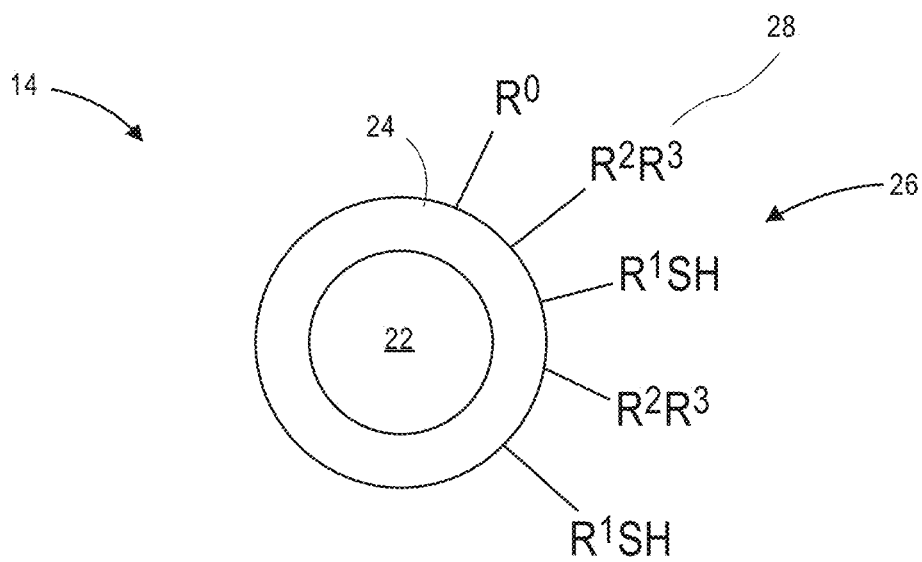
FIG. 2 illustrates a core-shell particle, according to an aspect of the present disclosure.

As shown at FIG. 2, the core-shell particles 14 comprise a core 22 comprising a ferromagnetic material. The ferromagnetic material can be a ferromagnetic metal or ferromagnetic metal oxide. For example, the ferromagnetic material can be at least one material chosen from $Fe_3O_4$, Fe, Co, or Ni.

A shell 24 is disposed around the core 22. The shell 24 comprises silica to which various functional groups can be attached. The functional groups function together to couple the particles to both the substrate 10 and the polysulfide resin. One example of functional groups includes silyl ether functional groups for coupling the particles 14 to the substrate 10. Other functional groups include sulfur-containing functional groups for coupling the particles 14 to the polysulfide resin.

The silyl ether functional groups, shown as $R^0$ in FIG. 2, can be formed using any suitable precursors. In one example, the use of TEOS to form the $SiO_2$ shell 24 can result in silyl ether functional groups (e.g., alkoxy groups) at the $SiO_2$ shell surface, as will be described in more detail below.

The sulfur-containing functional groups can be derived from organic sulfur-containing compounds, such as an alkoxy silane having at least one thiol functional group. The alkoxy silane attaches to the shell 24 to form a thiol moiety. An example thiol moiety 26 is shown in FIG. 2, which includes the —SH functional group attached to the shell 24 via an $R^1$ group that can be derived from the treating compound. For example, $R^1$ can be an alkoxysilane group with an alkyl bridge connecting the alkoxysilane group to the thiol group, or any other suitable moiety derived from the treating compound. Examples of suitable treating compounds for forming the thiol moieties include alkoxy silanes chosen from bis[3-(triethoxysilyl)propyl]tetrasulfide, 3-mercaptopropyltrimethoxysilane, 3-mercaptopropyltriethoxysilane, 3-mercaptopropylmethyldimethoxysilane, or combinations thereof.

The core-shell particles can optionally include a surface property (e.g., surface energy) modifying moiety attached to the thiol functionalized silica shell. The surface property (e.g., surface energy) modifying moiety can be any moiety suitable for modifying the hydrophilic or hydrophobic properties of the core-shell particles. An example moiety 28 is shown in FIG. 2, which includes an alkyl functional group, $R^3$, such as a methyl, ethyl or propyl group, attached to the shell 24 via an $R^2$ group that can be derived from the treating compound. For example, $R^2$ can be an alkoxysilyl bridge or any other suitable group derived from the treating compound. Examples of suitable treating compounds for increasing hydrophobicity include alkyl substituted alkoxysilanes. Examples of suitable treating compounds for increasing hydrophilicity include amino silanes, in particular quaternary amino silanes, and carboxylic acid containing silanes. The core-shell particles can have an average primary particle size ranging from about 10 nm to about 1000 nm, such as from about 50 nm to about 150 nm, 250 nm or 500 nm. The term "primary particle size" as used herein refers to the size of individual particles, as distinguish from aggregated particles.

When added to a low viscosity polysulfide sealant formulation, the core-shell particles can be made mobile in a magnetic field. Under the influence of the magnetic field, the core-shell particles can potentially be rapidly transported to the substrate/sealant interface where they can react with substrate and sealant and potentially promote adhesion between sealant and substrate.

In addition to the polysulfide polymer and core-shell particles, the low viscosity polysulfide sealant composition can include an oxidizer that acts as a crosslinking agent, such as a powder comprising $MnO_2$ particles. The $MnO_2$ particles can have any suitable average particle size, such as 1 nm to about 100 microns, or about 10 nm to about 10 microns. While larger particle sizes can be used, small particle sizes of 100 nm or less, such as, for example, a particle size ranging from about 1 nm to about 500 nm, or 10 nm to about 100 nm may have advantages. For example, the increased particle surface area provided by the smaller particle sizes can result in increased reaction rates and thereby reduce the cure time. Thus, smaller particles sizes can be used where decreased cure times are desired.

The low viscosity sealant composition can also include one or more liquid carriers in an amount sufficient to provide the desired viscosity. Examples of known liquid carriers include toluene, methyl ethyl ketone or methyl isobutyl ketone. Any suitable concentration of liquid carrier can be employed. For example, the amount of liquid carrier can range from 0 to about 60 wt %, such as about 20 to about 40 wt % solvent, based on the total weight of the low viscosity sealant composition.

The low viscosity sealant can have any suitable viscosities and can be applied to any desired thickness. Suitable viscosities can range, for example, from about 1 Poise to about 1000 Poise, such as about 10 to about 500 Poise. Example thicknesses for the low viscosity sealant can range from about 1 mil to about 10 mil.

As discussed above, a high viscosity polysulfide composition can be applied to the first stage sealant coating formed from the low viscosity composition. The high viscosity polysulfide sealant composition includes a curable polysulfide polymer. The polysulfide polymer can be the same as or different that the polymer used in the low viscosity polysulfide sealant composition. Any of the polysulfide polymers taught herein for use in the low viscosity polysulfide sealant composition can be employed. A variety of commercially available sealant compositions can be employed.

The high viscosity composition has a viscosity that is higher than that of the low viscosity composition. Example viscosities for the high viscosity polysulfide sealant composition range from about 1000 to about 100,000 Poise, such as about 5000 to about 20,000 Poise, or about 10,000 Poise. Example thicknesses for the high viscosity layer can range from about 10 mils to about 1 inch.

The high viscosity polysulfide can also include a powder comprising $MnO_2$ particles. $MnO_2$ is the current curative used in aerospace polysulfide sealants and its resulting physical and mechanical properties are well known. Commercial materials incorporate $MnO_2$ with primary particle sizes on the order of microns or larger.

However, in many instances it would be desirable for the cure rate of the high viscosity polysulfide material to be accelerated. One technique for accelerating curing while still maintaining the desirable properties of $MnO_2$ cured polysulfides is to use high surface area $MnO_2$ fillers in the high viscosity polysulfide resin.

High surface area particles similar to those described above can be employed. The high surface area particles can have an average particle size of 100 nm or less, such as about 1 nm to about 100 nm, or about 10 nm to about 50 nm. Such small particle curatives increase the amount of catalytic surface area per mass of polysulfide resin and in doing so increase the cure rate of the high viscosity polysulfide material while maintaining the cure properties of the traditional polysulfide materials.

Suitable techniques for producing small particles are known in the art. Such techniques can be adapted in order to produce the high surface area $MnO_2$ powders for use in polysulfides. Examples of known techniques include mixing $KMnO_4$ in aqueous solution with a reducing agent, such as ascorbic acid, HCl or $H_2SO_4$. Other methods can also be employed.

The present disclosure is also directed to a process for making core-shell particles 14. The process includes coating a plurality of ferromagnetic core particles 22. The particles can be obtained commercially or synthesized using any suitable technique.

In some cases, the core particles 22 can be nanoparticles synthesized in situ from a solution. Examples of suitable methods for synthesizing particles from solution are well known in the art. Such synthesis routes can sometimes create stable colloidal dispersions with discrete nanoparticles and significantly less aggregation than dry commercial powders, thereby creating small, high surface area particles usable for the next step in the process without further additives, such as the addition of a dispersant.

In some instances, such as where dry particles are commercially obtained, it may be beneficial to add one or more dispersants due to the tendency of nanoparticles to aggregate to larger micron structures. Aggregation can be reduced by treating the ferromagnetic particles with a dispersant prior to further processing. For example, a silane surface treatment of the particles can introduce water soluble groups for improved dispersion. This can be accomplished through, for example, addition of an ionic silane, such as carboxylate salt-containing silanes, or the like, that can be attached to the surface of the core particles. The dispersant is intended to better break up aggregates, allowing greater exposed surface area for subsequent modification. Particles with greater exposed surface area are also attractive due to their improved reinforcing effect on elastomer materials such as polysulfides.

The particle core sizes can be any suitable size. For example, the average particle core size can be about 10 nm to about 500 nm, such as about 15 nm to about 100 nm.

The ferromagnetic particles are coated with a silica shell 24 using any suitable technique. This creates a functional surface that is highly reactive towards silane modifying groups. It also forms a protective barrier to isolate the magnetic core from the substrate, which may reduce the potential for substrate corrosion. In one implementation, a $SiO_2$ shell may be grown in a Tetraethyl orthosilicate ("TEOS") solution around a suspension of the core particles. Techniques for growing silica films on particles using TEOS are generally well known in the art.

The use of TEOS to form the $SiO_2$ shell can result in silyl ether functional groups (e.g., alkoxy groups) at the $SiO_2$ shell surface. These silyl ether groups are reactive toward substrate surface groups (e.g., hydroxyls) and can act to couple the particles to the substrate. Other organosilicates that will provide the desired silyl ether functional groups can also be used in place of or in addition to TEOS. In yet other implementations, the silica surface can be treated with compounds in a separate step after the silica shell is formed to provide the silyl ether functional groups.

The next processing step involves adding an adhesive element to link particles to the polysulfide network and establish a bridge between substrate and sealant. This is accomplished through the addition of thiol-containing silanes that react with the $SiO_2$ shell and present chemical groups similar or identical to the reactive end groups in the polysulfide sealant precursor material itself in order to form a direct chemical bond between sealant and particle.

For example, the silica shell 24 can be treated with any of the organic sulfur-containing compounds described herein to form thiol moiety 26 attached to the silica shell 24. The organic sulfur-containing compounds can be an alkoxy silane having at least one thiol functional group. Examples of the organic sulfur-containing compounds include alkoxy silanes chosen from bis[3-(triethoxysilyl)propyl]tetrasulfide, 3-mercaptopropyltrimethoxysilane, 3-mercaptopropyltriethoxysilane or 3-mercaptopropylmethyldimethoxysilane. The organic sulfur groups on the particle can react with the polysulfide sealant, while the unreacted silyl ether functional groups (e.g., alkoxy groups) at the $SiO_2$ shell can react with the substrate surface.

The process can optionally include an additional step of treating the thiol functionalized silica shell with a compound suitable for modifying the hydrophilic or hydrophobic properties of the core-shell particles. For example, the surface energy of the particle can be modified through the incorporation of additional silanes to the $SiO_2$ shell that increase or decrease hydrophilic/hydrophobic character. This modification may allow for a tuning of particle properties that promote localization at the interface between substrate and polysulfide as opposed to residing in the bulk sealant material. This energetic driving force is intended to complement the magnetic pull force designed to localize adhesive particles at the interface shortly after polysulfide application in order to speed adhesive bond strength.

EXAMPLES

Example 1

Synthesis of In Situ $Fe_3O_4$ Nanoparticles

Figure 3:
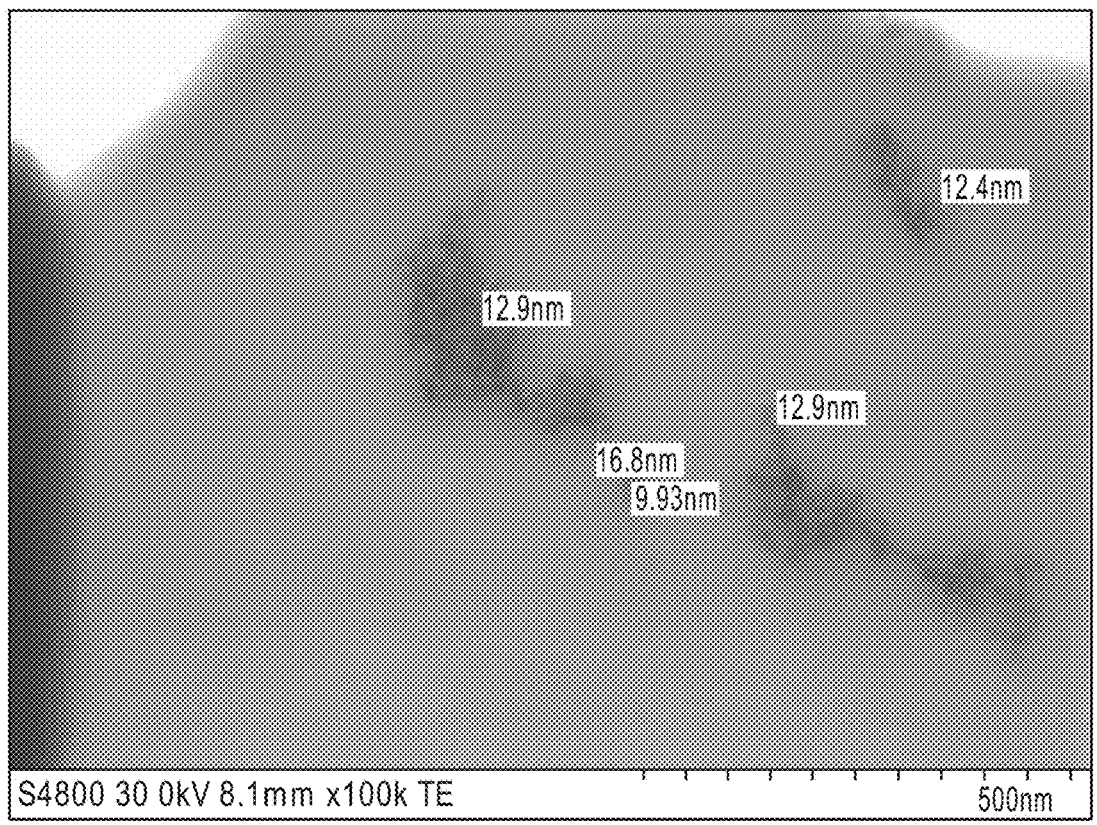
FIG. 3 is a TEM image showing nanoparticle morphology, according to an example of the present disclosure.

Spherical magnetite ($Fe_3O_4$) nanoparticles of ~10 nm were synthesized using the following method. An acidic iron salt solution was prepared by dissolving 5.46 g of $FeCl_3.6H_2O$ and 2.00 g of $FeCl_2.4H_2O$ in 60 ml of a ~0.17M HCl solution, to which 0.6 g of PEG-2000 was added. A basic PEG solution was also prepared by adding 1 g of PEG-2000 to 100 ml of 1M NaOH in a three-neck flask. The acidic iron salt solution was delivered to the basic PEG solution at ~1 drop per second. The black colloidal resulting solution was then allowed to grow for 2 hours at 60° C. under vigorous mechanical stirring and constant argon flow. Particles were finally collected by magnetic separation and resuspended in water. This washing step was repeated several times until supernatant became neutral. Purified particles were resuspended in water and part of the suspension was freeze-dried for analysis. A TEM image showing the nanoparticle morphology is shown in FIG. 3. The FIG. 3 TEM image shows $Fe_3O_4$ nanoparticles having a particle diameter of about 10 to about 12 nm.

Example 2

TEOS Coating of In Situ $Fe_3O_4$ Nanoparticles

Figure 4:
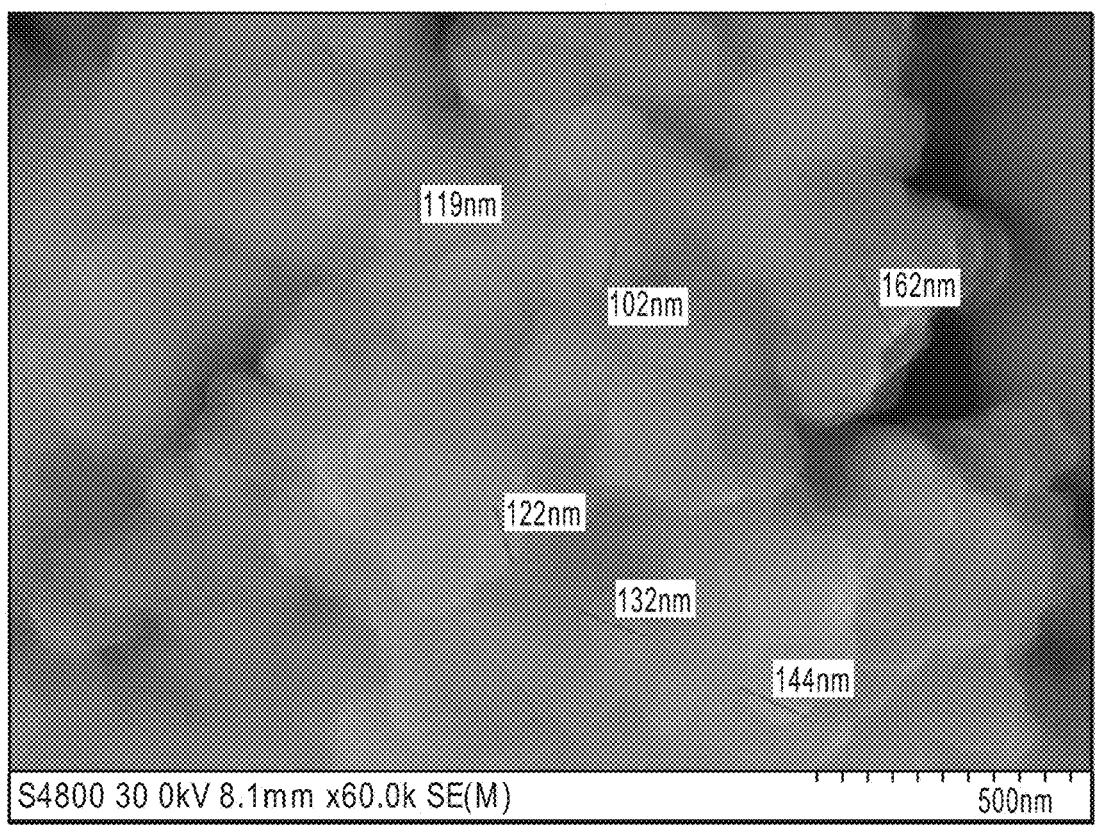
FIG. 4 shows an SEM image of $Fe_3O_4$ nanoparticles after coating with an $SiO_2$ shell made using TEOS, according to an example of the present disclosure.
Figure 5A:
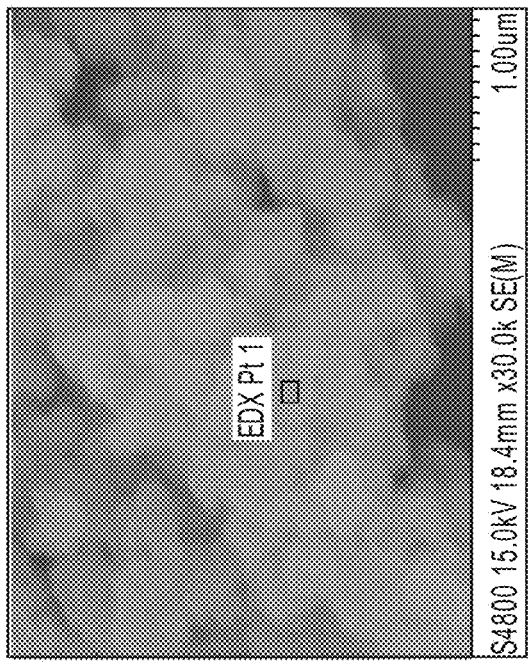
FIGS. 5A and 5B show EDX data confirming the presence of iron, silicon and oxygen in agglomerates of nanoparticles, according to an example of the present disclosure.
Figure 5B:
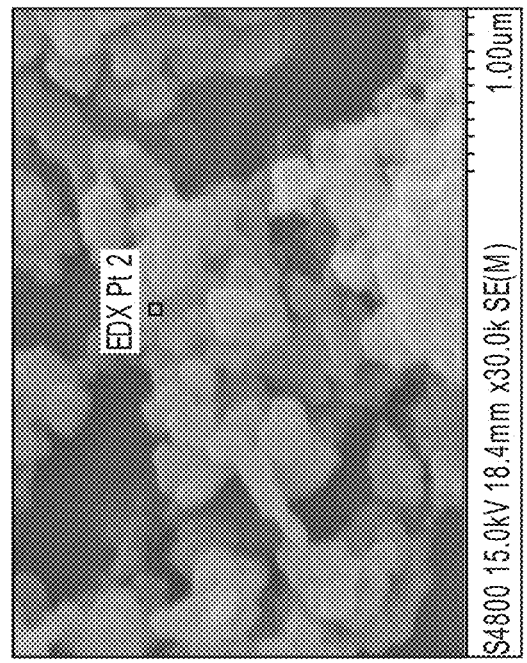

As-prepared $Fe_3O_4$ nanoparticles (Example 1) were used as seeds for TEOS coating. First, a 2 wt. % $Fe_3O_4$ suspension was prepared and sonicated for 5 minutes. Subsequently, 19 ml of this homogeneous suspension was diluted with 80 ml of ethanol and sonicated for another 5 minutes. The TEOS coating was performed by adding 10 ml of a 28% TEOS (in ethanol) solution to the diluted magnetite suspension under vigorous stirring and at ~0.2 drops per second. The resulting solution was then allowed to grow for 14 hours. The purification of particles was done by first collecting particles by magnetic separation and then resuspending particles in water. Particles were washed a second time by resuspending in ethanol. This two-step washing step was repeated a few times to obtain purified silica coated $Fe_3O_4$ nanoparticles which were dried in a 60° C. oven for 24 hrs. FIG. 4 shows an SEM image of the Fe$_3$O$_4$ nanoparticles after coating with TEOS. The silica coated Fe$_3$O$_4$ shown have particle diameters ranging from about 90 nm and about 150 nm, indicating agglomerated Fe$_3$O$_4$ nanoparticles coated by a silica shell. The EDX data shown in FIGS. 5A and 5B confirms the presence of iron, silicon and oxygen in the agglomerates.

Example 3

Thiol Surface Treatment

Silica coated Fe$_3$O$_4$ nanoparticles were further functionalized with thiol groups by treating as-prepared particles with silanes following Gelest, Inc. 2006 catalog, p. 19. The silane used was first hydrolyzed and the silica coated Fe$_3$O$_4$ nanoparticles were added. In brief, 0.5 ml of water was added to 9.5 ml of ethanol and the pH adjusted to ~5. The silane was then added to this ethanol solution to make a 2 wt. % final solution and was allowed to stir for 5 minutes. The silica coated Fe$_3$O$_4$ nanoparticles were added at a mol ratio of 1:1 (Fe$_3$O$_4$:Silane). Once the nanoparticles were added and allowed to stir for 3 minutes, the nanoparticle slurry was decanted and rinsed twice with ethanol. To allow for curing of silane layer, the nanoparticle slurry was placed at 110° C. for 5-10 minutes. Examples of silanes used to functionalize silica coated Fe$_3$O$_4$ nanoparticles were: 3-Mercaptopropyltrimethoxysilane and 3-Mercaptopropyltrimethoxysilane.

Example 4

Magnetic Nanoparticles in Sealant Formulation

A PPG 1776 Class A sealant available from PPG Industries was mixed according to manufacturer instructions, and custom silica coated iron oxide ("Fe$_3$O$_4$@SiO$_2$") nanoparticles were added to form a 1 wt % of particles in sealant mixture. The sealant was painted onto a primed aluminum panel and exposed to a magnetic field generated by a neodymium magnet placed against the aluminum opposite the sealant for two hours after which the sample was placed in an 80° C. oven to cure for 4 hours. Two control samples were simultaneously prepared either without magnetic particles or without exposure to a magnetic field.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A process for making core-shell particles, the process comprising:
   coating a ferromagnetic particle with a silica shell; and
   treating the silica shell with an organic sulfur-containing compound to form an —R$^1$SH moiety attached to the shell, where the SH is a terminal thiol functional group and the R$^1$ is an alkoxysilane group with an alkyl bridge connecting the alkoxysilane group to the terminal thiol functional group.

2. The process of claim 1, further comprising treating the ferromagnetic particle with a dispersant prior to coating.

3. The process of claim 1, wherein the organic sulfur-containing compound is an alkoxy silane chosen from bis[3-(triethoxysilyl)propyl]tetrasulfide, 3-mercaptopropyltrimethoxysilane, 3-mercaptopropyltriethoxysilane, or 3-mercaptopropylmethyldimethoxysilane.

4. The process of claim 1, further comprising modifying hydrophilic or hydrophobic properties of the core-shell particles.

5. The process of claim 1, wherein the core-shell particles have a primary particle size ranging from about 10 nm to about 1000 nm.

6. The process of claim 1, wherein the core-shell particles have a primary particle size ranging from about 50 nm to about 150 nm.

7. The process of claim 1, wherein the ferromagnetic particle comprises a ferromagnetic metal or ferromagnetic metal oxide.

8. The process of claim 1, wherein the ferromagnetic particle comprises at least one material chosen from Fe$_3$O$_4$, Fe, Co, or Ni.

9. The process of claim 8, wherein the organic sulfur-containing compound is an alkoxy silane having at least one —SH functional group.

10. The process of claim 1, wherein the core-shell particles include silyl ether functional groups attached to a surface of the shell.

11. A core-shell particle comprising:
   a core comprising a ferromagnetic material; and
   a shell comprising silica treated with an organic sulfur-containing compound to provide an —R$^1$SH moiety attached to the shell, where the SH is a terminal thiol functional group and the R$^1$ is an alkoxysilane group with an alkyl bridge connecting the alkoxysilane group to the terminal thiol functional group.

12. The core-shell particle of claim 11, wherein the organic sulfur-containing compound is an alkoxy silane chosen from bis[3-(triethoxysilyl)propyl]tetrasulfide, 3-mercaptopropyltrimethoxysilane, 3-mercaptopropyltriethoxysilane, or 3-mercaptopropylmethyldimethoxysilane.

13. The core-shell particle of claim 11, further comprising a surface property modifying moiety attached to the shell, the surface property modifying moiety modifying hydrophilic or hydrophobic properties of the core-shell particle.

14. The core-shell particle of claim 11, wherein the core-shell particle has a primary particle size ranging from about 10 nm to about 1000 nm.

15. The core-shell particle of claim 11, wherein the core-shell particle has a primary particle size ranging from about 50 nm to about 150 nm.

16. The core-shell particle of claim 11, wherein the ferromagnetic material comprises a ferromagnetic metal or ferromagnetic metal oxide.

17. The core-shell particle of claim 11, wherein the ferromagnetic material comprises at least one material chosen from $Fe_3O_4$, Fe, Co, or Ni.

18. The core-shell particle of claim 17, wherein the core-shell particle includes silyl ether functional groups attached to a surface of the shell.

19. The core-shell particle of claim 17, wherein the organic sulfur-containing compound is an alkoxy silane chosen from bis[3-(triethoxysilyl)propyl]tetrasulfide, 3-mercaptopropyltrimethoxysilane, 3-mercaptopropyltriethoxysilane, or 3-mercaptopropylmethyldimethoxysilane.

20. The core-shell particle of claim 11, wherein the core-shell particle includes silyl ether functional groups attached to a surface of the shell.

\* \* \* \* \*